United States Patent [19]

Moeller

[11] 4,325,775

[45] Apr. 20, 1982

[54] DELABELER

[76] Inventor: Horst Moeller, W224 N4915 West View Dr., Sussex, Wis. 53809

[21] Appl. No.: 118,197

[22] Filed: Feb. 4, 1980

[51] Int. Cl.³ ........................ B32B 31/18; B67C 1/08

[52] U.S. Cl. .......................................... 156/584; 15/4; 15/21 D; 15/59; 15/60; 15/63; 15/302; 15/DIG. 5; 134/72; 134/104; 156/154; 156/344

[58] Field of Search ...................... 15/4, 21 D, 59, 60, 15/63, 70, 88, 302, DIG. 5; 51/DIG. 17; 134/72, 104; 156/154, 344, 584, DIG. 42

[56] References Cited

U.S. PATENT DOCUMENTS

| | | | |
|---|---|---|---|
| 1,446,553 | 2/1923 | Eberly | 15/59 |
| 1,714,075 | 5/1929 | Carvalho | 15/60 X |
| 1,870,503 | 8/1932 | Gruetter | 15/60 |
| 1,923,743 | 8/1933 | Perkins | 15/59 |
| 2,118,527 | 5/1938 | Schmutzer et al. | 156/DIG. 42 X |
| 2,516,998 | 8/1950 | Kimball et al. | 15/101 |
| 2,573,169 | 10/1951 | Gerlach etal. | 134/104 |
| 2,640,212 | 6/1953 | Hamilton | 15/60 |
| 3,534,428 | 10/1970 | Pugh et al. | 15/302 |
| 4,013,497 | 3/1977 | Wolf | 156/154 |

*Primary Examiner*—Edward C. Kimlin
*Assistant Examiner*—Robert A. Dawson
*Attorney, Agent, or Firm*—Andrus, Sceales, Starke & Sawall

[57] ABSTRACT

A delabeler (11) provides a conveyor (12) which sandwiches a series of containers (13) to positively rotatably move such containers through a plurality of processing stations. A strip brush section (31) includes a series of stations (32–35) each including a plurality of rotating brushes (53–55) located within specific planes and operated to completely remove the container labels. A scrub brush section (101) includes a similarly constructed series of scrub brush stations (102–105) which completely remove adhesive residue from the containers. A series of stations (27, 28, 100, 106) spaced throughout the delabeler provide a series of vertically spaced pulsating jets (29) of non-caustic fluid to the containers while an initial drenching station (25) preconditions the labels prior to further processing and a drying station (107) provides a completely dry and clean container following the delabeling.

18 Claims, 10 Drawing Figures

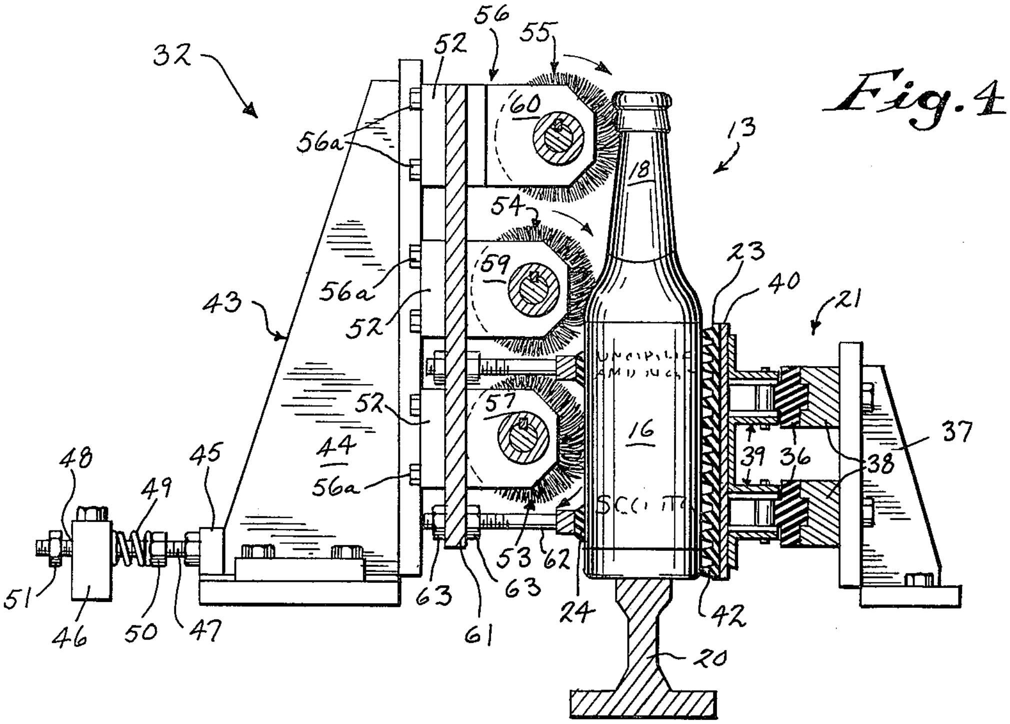
Fig. 4
Fig. 5
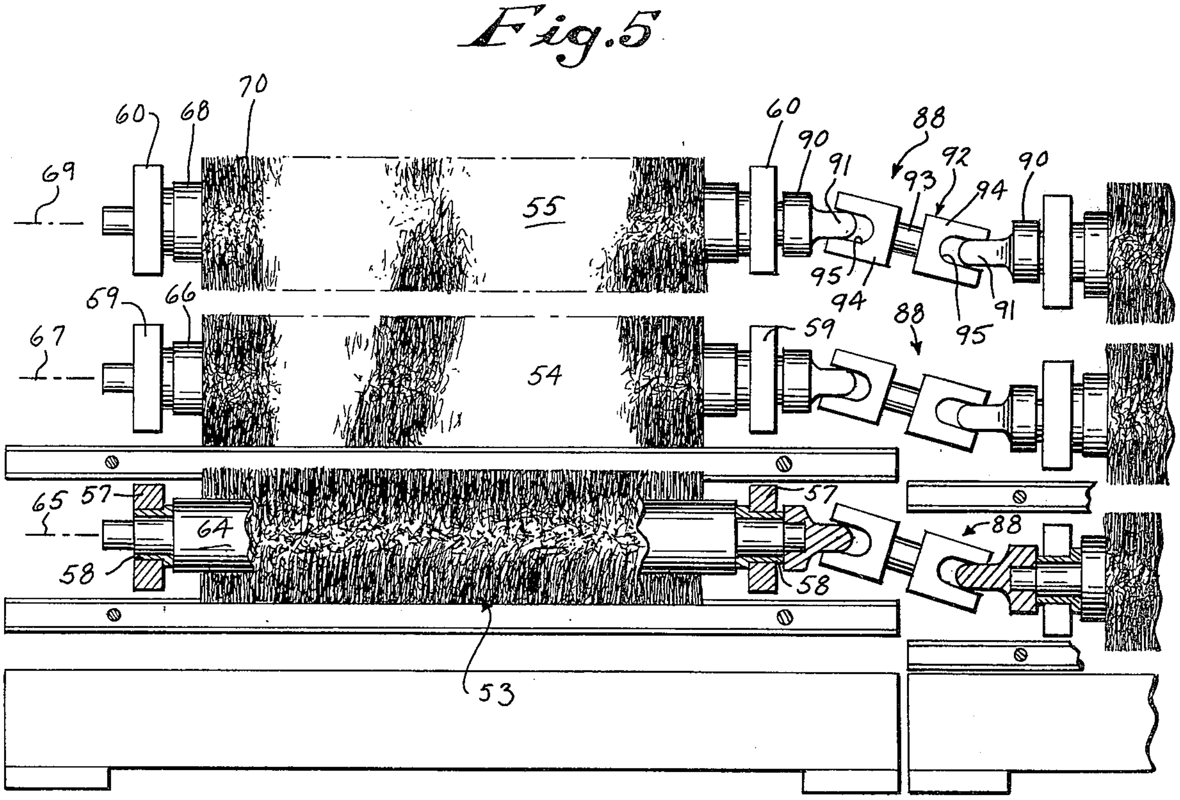

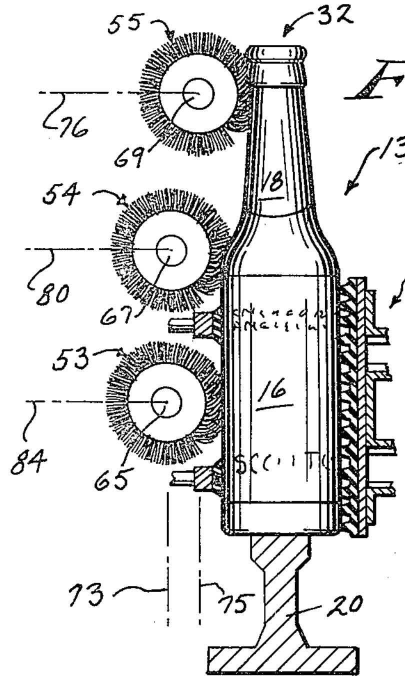
Fig. 6
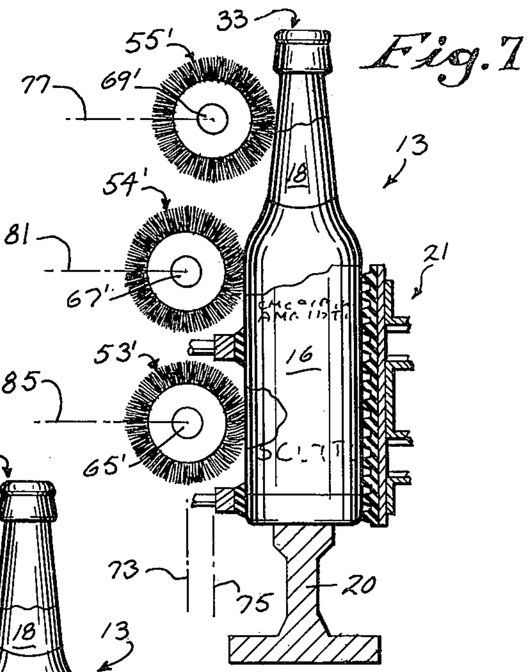
Fig. 7
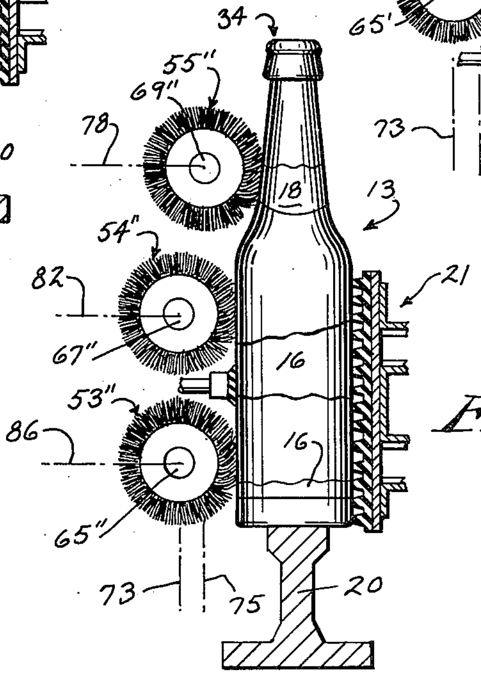
Fig. 8
Fig. 9
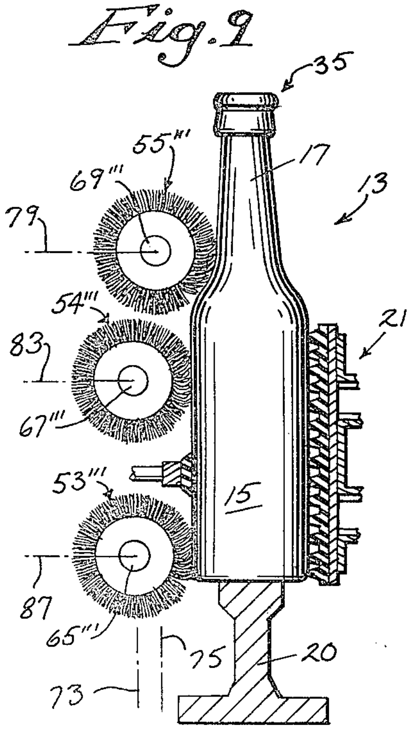
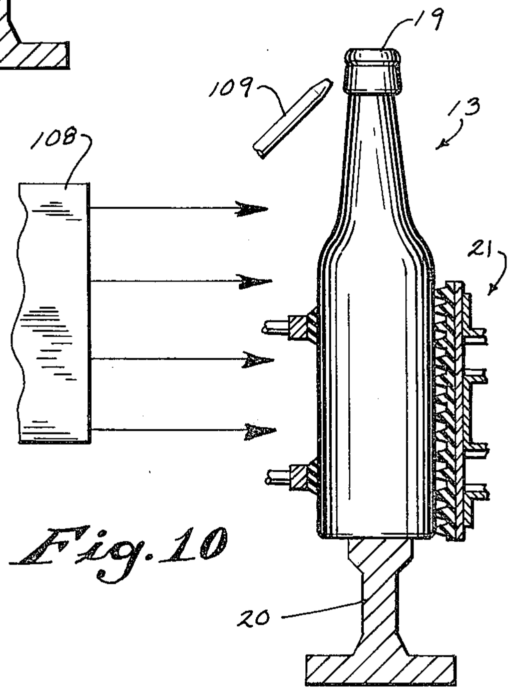
Fig. 10

DELABELER

BACKGROUND OF THE INVENTION

The invention relates to a delabeler and particularly to an apparatus which removes labels from a series of containers while moving along a processing line.

Containers, such as beer bottles, may at times be improperly labeled by a high speed bottling operation wherein fluid, such as beer or other sorts of beverages, has been inserted into the bottle and sealed by a cap to be in condition for storage, shipment and consumption by the ultimate purchaser.

Frequently, a strong adhesive is used to maintain rigid adherence of the labels to the bottle in order to prevent such labels from being accidentally or deliberately removed prior to usage by the ultimate consumer. When mis-labeling occurs, such as might occur through changes in labeling regulations occurring prior to shipment or sale of previously filled and labeled containers, the labels must be completely removed before correct labels can be applied to the bottles.

Where the containers contain substances for human consumption, such as beer for example, it is undesirable to employ caustic agents for label removal because of the concern of finding caustic residue remaining in and about the cap following such label removal process. Previous mechanical label removers which operate without caustic solutions have experienced great difficulty in effectuating complete label removal and particularly in the complete removal of both the label and the associated adhesive from the container surface. Frequently, such labels must be immersed in fluid during a delabeling process to effect complete label removal. Such difficulty in removal has been particularly experienced with foil type labels which have been found to provide extreme resistance to label removing processes which do not employ caustic solutions.

BRIEF SUMMARY OF INVENTION

A series of containers are moved through a strip brush station which includes a plurality of brushes each including a plurality of circumferentially spaced, radially extending coarse bristles rotating about an axis to engage each moving container to remove the label. A scrub brush station includes a plurality of brushes each including a plurality of circumferentially spaced, radially extending fine bristles having a greater flexibility than the coarse bristles which rotate about an axis to engage each moving container to remove the adhesive.

The delabeler is operable to move the series of containers through a processing station wherein a stationary member and an oppositely disposed moving member firmly engage opposite sides of the container to positively clamp and rotatably move the container through the processing station while a rotating member abrades the label from the container.

A biasing force is applied to the stationary member to provide continuing clamping pressure upon the rotating container and further applies pressure upon the rotating abrading member to provide an efficient abrasion of the label. An adjustable member is selectively preset to provide preselected biasing force to the clamping stationary member and to the rotating abrading member.

A delabeling abrading station includes first and second rotary label abrading members which are positioned in radially spaced relationship with respect to each other to simultaneously engage a moving container to remove a portion of the label from such container. The rotating axes of the first and second abrading members are located within separate planes spaced from separate planes containing the first and second abrading member axes of another station to substantially remove the label from the container. In a preferred construction, four label abrading stations are spaced along the container movement path each including three rotating abrading members which are simultaneously operable to abrade container labels with each of the axes within separate planes spaced in a vertical direction.

The rotating level abrading members are also selectively positioned within certain horizontally spaced planes to simultaneously engage different container portions having different dimensions to effectuate simultaneous label removal over varying configurations of the container.

Certain rotary label abrading members located along the container movement path are coupled together for simultaneous rotation by a pair of facing nipples fixedly connected to the axial ends of the rotating abrading members for rotation therewith and function with a coupler providing spaced cavities each pivotally connected to one of the nipples for rotation therewith to provide simultaneous rotation between such adjacent abrading members while operating in separate spaced planes.

Prior to being subjected to the label abrading stations, a drenching station including a nozzle vertically spaced from the container movement path operates to provide a high volume of non-caustic fluid to the labels on the rotating containers.

A pressure wash station includes a series of vertically spaced fluid jets operable to provide a series of vertically spaced pulsating jets of non-caustic fluid to such labels on the rotating containers.

Upon departure from the strip brush station and before entry into scrub brush station, a spray wash station provides a series of vertically spaced fluid jets operable to provide a series of vertically spaced pulsating jets of non-caustic fluid to the rotating containers to remove label residue.

Following departure from the scrub brush section, the rinse station provides a series of vertically spaced fluid jets operable to provide a series of vertically spaced pulsating jets of non-caustic fluid to the rotating containers to remove adhesive residue.

Following departure from the rinse station, a drying station provides an air pressure source widely directing drying fluid against each rotating container while an upwardly directed nozzle applies an air jet at the outer periphery of the downwardly extending flanges of each cap to remove all moisture and to provide a completely clean and dry delabeled container.

The delabeler provides complete label removal including both the label and associated adhesive without employing caustic solutions which might otherwise pose health hazards to a removably sealed container. The delabeler maintains the integrity of the product within such sealed container during label removal provided by a high speed delabeling sequence in a production line type of operation.

Further aspects of the invention are disclosed in the claims, drawings and specification as hereinafter provided.

BRIEF DESCRIPTION OF THE DRAWINGS

FIG. 4 is a sectional view taken along lines 4—4 of FIG. 1 and shows a first station employed within a strip brush section of the brushing compartment of the label remover of FIG. 1;

FIG. 5 is a sectional view taken along the lines 5—5 of FIG. 1 and showing the first station of FIG. 4 and a portion of a second station within the strip brush section of the label remover of FIG. 1;

FIG. 6 is a diagrammatic view with parts broken away of the station of FIG. 4;

FIG. 7 is a diagrammatic view with parts broken away of the second station within the strip brush section in the brushing compartment of the label remover of FIG. 1;

FIG. 8 is a diagrammatic view with parts broken away of a third station within the strip brush station in the brushing compartment of the label remover of FIG. 1;

FIG. 9 is a diagrammatic view with parts broken away of a fourth station within the strip brush section in the brushing compartment of the label remover of FIG. 1; and FIG. 10 is a diagrammatic illustration with parts broken away of the drying compartment of the label remover of FIG. 1.

DESCRIPTION OF THE PREFERRED EMBODIMENT

Figure 1:
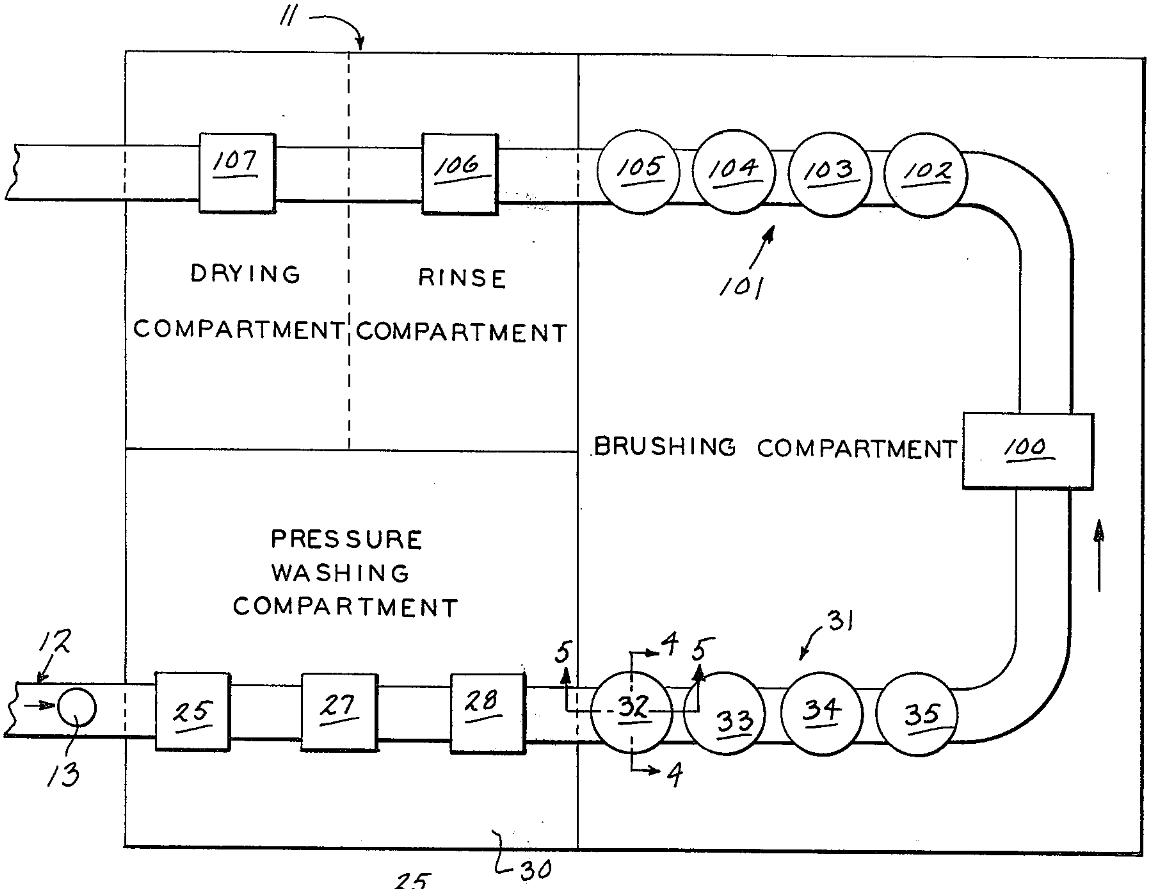
FIG. 1 is a diagrammatic block illustration of a label remover including a series of stations.

A label remover 11 operates with a high speed conveyor 12 which carries a series of labeled containers 13 which are destined to be relabeled. Some containers 13 may include a bottle 14 having a lower portion 15 providing an outer circumferential surface (with a diameter $D_1$) containing a label 16 and an upper neck portion 17 providing an outer circumferential surface (with a diameter $D_2$ which is substantially smaller than diameter $D_1$) containing a label 18. The bottle 14 is sealed by a cap 19 at the upper portion of neck 17.

The high speed conveyor 12 includes a guide rail 20 which slidably supports the series of containers 13 as they progress through a series of compartments and associated stations within the delabeler 11. One or more movable drive assemblies 21 is mounted along one side of rail 20 and engages the lower portion 15 of each container 13. Stationary guide rails 22 are mounted on the opposite side of rail 20 and engage the lower portion 15 of each container 13. The movable drive 21 may include a continuous drive mounted along the extent of conveyor 12 or may comprise several sections operating separately along portions of conveyor 12. In any event, the movable drive 21 includes one or more container engaging surfaces 23, such as rubber pads or the like, which are moved by conveyor type chains or other similar structure so as to move along rail 20 and maintain driving pressure against the lower portion 15 of each container 13. In such manner, container 13 is firmly sandwiched between one or more stationary rails 24 and the moving pads 23 which causes each container 13 to be continuously and positively rotated as it slides along rail 20. The clamping force provided by the rails 24 and moving pads 23 thus positively rotates each container 13 in synchronism with the moving pads 23.

Figure 2:
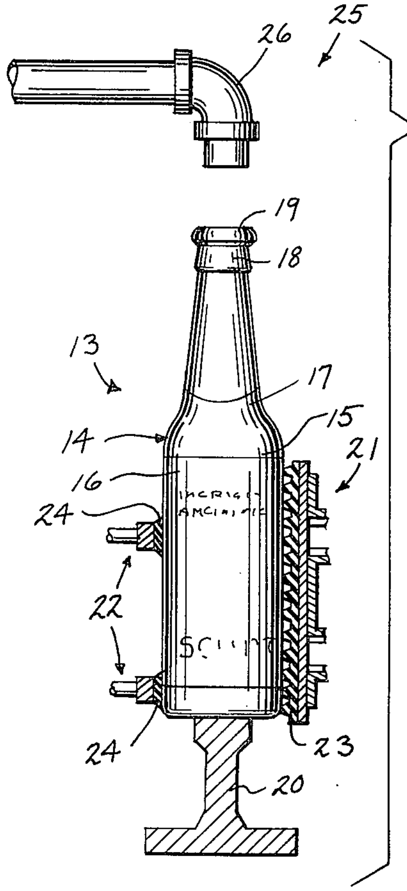
FIG. 2 is a diagrammatic view with parts broken away of a drenching station within a washing compartment of the label remover of FIG. 1.

Upon entry into the delabeler 11, each continuously rotating container 13 enters a drenching station 25 wherein each labeled container 13 is drenched for a short period of time with non-caustic fluid, such as water. As illustrated in FIG. 2, the drenching station 25 includes a fluid nozzle 26 located above rail 20 for directing fluid such as water onto the labeled container as it rotatably slides along rail 20.

Figure 3:
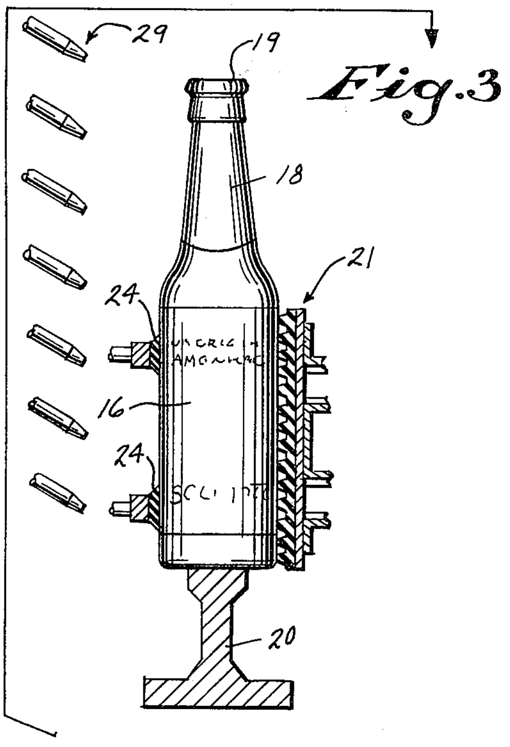
FIG. 3 is a diagrammatic view with parts broken away of a pressure wash construction employed within first and second pressure wash stations within the washing compartment, within an intermediate wash section within a brushing compartment, and within a pressure wash station within a rinse compartment of the label remover of FIG. 1.

A pair of pressure wash stations 27 and 28, as illustrated in FIG. 3, each includes a series of vertically spaced, high pressure fluid jets 29 which direct non-caustic type fluid, such as water, along the sides of each rotating container 13 as it slides along rail 20. The series of nozzles 29 may be vertically spaced within a common plane or may be located in several vertical planes spaced longitudinally along the rail 20. In any event, the continuous rotation of bottle 13 permits the high pressure fluid to engage all circumferential portions of each container 13 as it passes through the pressure wash stations 27 and 28. In a preferred construction, each of the jets 29 provides a pulsating output whereby intermittent pulses of high pressure water is directed against the labels 16 and 18. In some situations, loosely attached labels 16 and 18 and the adhesive associated therewith may be partially or substantially removed by the action of the high pressure jets 29 as each container 13 passes through the pressure wash stations 27 and 28. In most situations however, only a small portion, if any, of the labels 16 and 18 and the associated adhesive will be removed by the washing compartment 30 including the drenching station 25 and the pressure wash stations 27 and 28.

It is therefore necessary to subject most of the containers 13 to a brush section 31 which includes a series of strip brush stations, as illustrated at 32, 33, 34 and 35 in FIG. 1. With reference to FIG. 4, the movable drive 21 associated with the strip brush section 31 includes a pair of vertically spaced rails 36 which are rigidly supported by a bracket support assembly 37 including interconnected mounting spacers 38. The guide rails 36 may form a continuous circular track having one side located adjacent to rail 20 and extending along stations 32, 33, 34 and 35 of the strip brush section 31. In any event, a pair of conveyor chains 39 slidably engage the rails 36 and movably support one or more plates 40 interconnected to one or more pads 23. In a preferred construction, the supporting plates 40 constitute steel plates while the pads 23 are formed of rubber and include a series of outwardly extending projections 42 which positively engage the outer circumferential surface of container 13 to provide a firm clamp and positive rotative movement thereto as previously described.

A support 43 provides an upstanding head 44 and a base portion 45 movably mounted to a fixedly retained support member 46 through a shaft 47. Specifically, the shaft 47 is movably retained within an opening 48 of support 46 while a biasing spring 49 engages a nut 50 threadedly retained by shaft 47 and the fixed support 46. In such manner, the spring 49 provides an axially directing biasing force to shaft 47 through the nut 50 in a direction extending toward the guide rail 20. Another nut 51 is threaded onto shaft 47 and functions as a stop to limit the maximum axial movement of shaft 47 in response to spring 49.

The upstanding head 44 includes a series of vertically spaced mounting brackets 52 extending longitudinally along rail 20. A series of vertically spaced brushes 53, 54 and 55 are each rotatably mounted to one of the mounting brackets 52 through a series of spaced supports 56 and threaded bolts 56*a*. Specifically, the brush 53 is rotatably supported by a pair of spaced mounting supports 57 through suitable bushings 58. Likewise, the brush 54 is mounted through mounting supports 59 with suitable bushings while brush 55 is mounted through mounting supports 60 and suitable bushings. A pair of spaced members 61 are connected to the vertically spaced mounting brackets 52 and support the rails 24 through adjustable studs 62 and associated locking nuts 63.

In that the pair of rails 24 are rigidly retained to the support 43, the spring 49 continually provides biasing pressure to rails 24 which thereby exert constant clamping pressure upon each container 13. In such manner, the moving pads 23 cooperate with the biased rails 24 to provide clamped positive rotation to each of the containers 13 as it passes through the strip brush station 32.

The pressure exerted by rails 24 upon each container 13 can be adjusted by rotating nuts 63 to vary the distance between the rails 24 and the members 61. The pressure exerted by the rails 24 upon each container 13 can also be adjusted by rotating nut 50 to vary the tension and/or compression of spring 49.

Furthermore, the pressure exerted by the brushes 53, 54 and 55 upon each slidably rotating container 13 can be selectively adjusted by varying the distance between the rails 24 and brackets 52 through the adjustment of the nuts 63.

The brush 53 includes a rod shaped core 64 rotatably journalled within the bushings 58 for rotation about an axis 65. The brush 54 also includes a rod shaped core 66 rotatably journalled within suitable bushings for rotation about an axis 67. The brush 55 likewise includes a rod shaped core 68 rotatably journalled within suitable bushings for rotation about an axis 69. Each of the rod shaped cores 64, 66 and 68 includes a plurality of circumferentially spaced, radially extending fibers or bristles 70 which are of extreme stiffness to provide minimal flexing for maximum stripping of the labels 16 and 18 from container 13.

The strip brush stations 33, 34 and 35 are constructed in a substantially similar manner as the strip brush station 32 previously described although the relative positioning of the series of brushes is varied. The corresponding or similar elements of strip brush station 33 will be identified with identical numbers primed whereas the corresponding or similar elements of strip brush station 34 will be identified with identical numbers double primed whereas the corresponding or similar elements of strip brush station 35 will be identified with identical numbers triple primed.

In viewing all four stations in strip brush section 31, the uppermost brushes 55 through 55''', inclusive, of the four stations 32 through 35, respectively, are designed to attack and strip the upper label 18 from the neck 17 of container 13. The intermediate brushes 54 through 54''', inclusive, together with the lower brushes 53 through 53''', inclusive, are designed to attack and strip the lower label 16 from the lower portion 15 of the container 13. As illustrated in FIG. 6, an axis 65 of brush 53 and the axis 67 of brush 54 are located within the same vertical plane 73 while the axis 69 of brush 55 is located in a vertical plane 75 which is spaced in a horizontal direction from plane 73. In some operations, all of the uppermost brushes 55 through 55''', inclusive, are located within the same vertical plane 75 while in other operations, certain of the brushes may be positioned in different vertical planes to provide variable stripping pressures between the series of upper brushes 55 through 55'''. Also, the intermediate brushes, i.e. brushes 54 through 54''', inclusive, and the lower brushes, i.e. brushes 53 through 53''' inclusive, may all be in the same vertical plane 73 or may be pre-set to be in different vertical planes to provide variable stripping pressures.

The plurality of brushes located at the plurality of stations within the strip brush section 31 are vertically spaced within separate horizontal planes. For example, the axis 69 of brush 55 within station 32 is located within a horizontal plane 76. The axis 69' of brush 55' within station 33 is located within a horizontal plane 77. The axis 69'' of brush 55'' within station 34 is located within a horizontal plane 78. The axis 69''' of brush 55''' within station 35 is located within a horizontal plane 79. In such manner, the series of uppermost brushes 55 through 55''', inclusive, within the series of strip brush stations attack different vertically spaced areas of label 18 to provide a complete stripping of such label from the container 13 as it rotatably slides along rail 20 through the strip brush section 31.

The axis 67 of the intermediate brush 54 within station 32 is located within a horizontal plane 80. The axis 67' of the intermediate brush 54' within station 33 is located within a horizontal plane 81. The axis 67'' of the intermediate brush 54'' within station 34 is located within a horizontal plane 82. The axis 67''' of brush 54''' within station 35 is located within a horizontal plane 83. In such manner, the series of intermediate brushes 54 through 54''', inclusive, within the series of strip brush stations attack different vertically spaced areas of the upper portion of label 16 to provide complete stripping of such label portion while the container 13 rotatably slides along the rail 20 through the strip brush station 31.

The axis 65 of lower brush 53 within station 32 is located within a horizontal plane 84. The axis 65' of the lower brush 53' within station 33 is located within a horizontal plane 85. The axis 65'' of the lower brush 53'' within station 34 is located within a horizontal plane 86. The axis 65''' of brush 53''' within station 35 is located within a horizontal plane 87. The brushes 53 through 53''', inclusive, within the series of strip brush stations attack different vertically spaced areas of the lower portion of label 16 to provide complete stripping of such label portion while the container 13 rotatably slides along rail 20 through the strip brush station 31.

The location of the plurality of brushes within the plurality of spaced horizontal planes 76 through 87, inclusive, provide extensive engagement of the bristles 70 of the plurality of brushes with each of the containers 13 to attack and completely remove all portions of labels 16 and 18. In certain situations, it may be desirable to have more than one brush within the same plane to provide repetitive stripping of substantially the same area.

The upper brushes 55 through 55''', inclusive, provided by the series of stations within the strip brush section 31 are interconnected through a series of couplings of the type as shown at 88 to be commonly rotated by a power source (not shown). In similar manner, the intermediate brushes 54 through 54''', inclusive, are interconnected through a series of similar couplings 88 to be commonly rotated by a power source (not shown). Likewise, the lowermost brushes 53 through 53''', inclusive, are interconnected through a series of similar couplings 88 to be commonly rotated by a power source (not shown).

The series of couplings 88 are similarly constructed and each includes a keyed yoke 90 fixedly connected to at least one end of each of the rod shaped cores, such as 68 for example, for rotation therewith. Each keyed yoke 90 includes an axially extending nipple 91 which is interconnected to a corresponding nipple of an adjacent keyed yoke 90 connected to an adjacent brush assembly through a coupling member 92. The coupling 92 includes a drive shaft 93 interconnecting oppositely spaced yokes 94 each including an internal cavity 95 pivotally coupled to the respective nipple 91 for rotation therewith. The pivotal coupling between nipples 91 and yokes 94 permit a simple but efficient construction for the transmittal of significant rotary power between adjacent interconnecting power shafts having spaced axes without requiring expensive or other types of power consuming couplings such as chain and sprocket assemblies, gear assemblies, etc. The highly desirable coupling 88 permits reliable performance which will not be interrupted by the appearance of debris such as sludge or the like which might otherwise interfer with the operation of conventional couplings, such as chain and sprocket assemblies or the like.

Thus with such couplings 88, the upper brushes 55 through 55''', inclusive, rotate in unison, the intermediate brushes 54 through 54''', inclusive, rotate in unison, and the brushes 53 through 53''', inclusive, rotate in unison. An appropriate drive (not shown), such as a hydraulic drive system or any other drive system, i.e. electric, etc., may be coupled through appropriate gearing or the like to simultaneously rotate the upper, intermediate, and lower tiers of brushes so that all of the brushes in the strip brush station 31 will rotate in unison. It is possible, however, to provide appropriate drive couplings to certain brushes to provide rotative operation in directions opposite to the rotation of other brushes. For example, the intermediate series of brushes 54 through 54''', inclusive, could be rotated in a direction opposite to the rotation of the upper and lower tiers of brushes 55 through 55''' and 53 through 53'''.

When the containers 13 depart from the strip brush section 31, substantially all portions of the labels 16 and 18 have been removed from the container 13. The delabeled container 13 is subjected to a spray wash station 100 which is constructed to operate as illustrated in FIG. 3 and previously described. In such manner, the removed label residue is washed away from the outer surface of container 13.

In situations where an extremely durable adhesive is employed to secure the labels 16 and 18 to the container 13, the action of the strip brush station 31 may not completely remove all of such adhesive from each container 13. It is thus necessary to subject the series of containers 13 to a scrub brush section 101. Such section 101 includes four scrub brush stations 102, 103, 104 and 105 which are constructed to operate in a substantially identical manner as shown and described with respect to the strip brush stations 32, 33, 34 and 35. The only significant difference is that each of the brushes employed in the scrub brush station 101 contain a finer bristle having a significantly greater flexibility and resiliency to attack and completely remove the remaining adhesive from the container 13.

Each of the series of containers 13 are subjected to a rinse compartment 106 which is constructed to operate in a manner as depicted in FIG. 3 and previously described. In such manner, a series of pulsating spray jets are directed to each of the rotatably sliding containers 13 to remove any residue from the outer surface of the containers 13. The containers 13 are thereafter introduced to a drying compartment 107, such as illustrated in FIG. 10. A source of air pressure 108 provides widely directed drying fluid against the outer surface of each container 13 to remove all moisture therefrom. In addition, an upwardly directed nozzle 109 provides an air jet which impinges at the outer periphery of the downwardly extending flanges of cap 19 to remove whatever moisture may have accumulated between the container 13 and cap 19.

The delabeler 11 provides a high speed container line which can be selectively adjusted for different operating speeds. For example, the operating chain drive 39 may be driven to rotate each container 13 at two and one-half revolutions per minute whereby the delabeler 11 may process approximately seven or more containers during each minute of operation. The speed of the chain drive 39 may be increased to rotate each container 13 at twenty five revolutions per minute whereby approximately seventy five containers 13 will be completely delabeled during every minute of operation. As another example, the speed of chain drive 39 may be increased to rotate each container 13 at more than thirty one revolutions per minute in which case the de-labeler 11 would process approximately one hundred containers for every minute of operation. Thus by increasing the speed of the chain drive 39, a large number of containers 13 may be completely de-labeled for each minute of operation to provide an extremely high speed operation which efficiently and effectively completely removes all of the labels and the associated adhesive.

The force exerted by spring 49 may be selectively adjusted to establish desired operating pressures by the brushes 53–55 and the rails 24 upon the containers 13. Also, spring 49 permits a resilient reaction to slight variations in container diameter to effectively remove the labels therefrom.

The delabeler 11 provides complete removal of all labels and associated adhesive from each container 13 without the use of caustic agents which might otherwise leave dangerous residue near the sealed container opening. The delabeler 11 permits complete label removal without requiring the containers to be immersed within a solution in order to effectuate label removal.

Various modes of carrying out the invention are contemplated as being within the scope of the following claims particularly pointing out and distinctly claiming the subject matter which is regarded as the invention.

1. A delabeler for removing one or more labels and associated adhesive from a container, comprising means to move a series of the containers through a plurality of processing stations, a strip brush station including a plurality of first brushes each including a plurality of circumferentially spaced, radially extending coarse bristles rotating about an axis spaced adjacent to said moving means and support means connected to said first brushes to position said coarse bristles against each moving container to remove the label, and a scrub brush station including a plurality of second brushes each including a plurality of circumferentially spaced, radially extending fine bristles having a greater flexibility than said coarse bristles and rotating about an axis spaced adjacent to said moving means and support means connected to said second brushes to position said fine bristles against each moving container to remove the adhesive.

2. The delabeler of claim 1, and including means to apply non-caustic fluid to each label while attached to the containers and including a series of spaced fluid jets located adjacent to said moving means and operable to provide a series of spaced pulsating jets of non-caustic fluid to each label.

3. The delabeler of claim 1, and including a series of spaced fluid jets located adjacent to said moving means and operable to provide a series of spaced pulsating jets of non-caustic fluid to each container to wash away label residue removed by said first brushes.

4. The delabeler of claim 1, and including a series of spaced fluid jets located adjacent to said moving means and operable to provide a series of spaced pulsating jets of non-caustic fluid to each container to wash away all residue removed by said second brushes.

5. The delabeler of claim 1, and including an air pressure source located adjacent to said moving means to direct drying fluid to each container to remove all moisture and provide a completely delabeled and dry container.

6. A delabeler for use with labeled containers, comprising means to move a series of the containers through at least one processing station, and a series of spaced fluid jets located adjacent to said moving means and operable to provide a series of spaced pulsating jets of non-caustic fluid to facilitate the removal of at least a portion of each label.

7. A delabeler for removing one or more labels from a container, comprising means to move a series of the containers through a plurality of processing stations, a plurality of label abrading stations with each station including first and second label abrading members each rotating about a generally horizontal axis, support means connected to support said first and second label abrading members in radially spaced relationship with respect to each other within each station to simultaneously engage said first and second abrading members against the moving containers to remove a portion of the label from each container, said first and second abrading member axes within one of said stations located in separate planes spaced from the separate planes containing said first and second abrading member axes of another station to substantially remove the label from the container.

8. The delabeler of claim 7, and including four label abrading stations spaced along said moving means with each station including a third rotating abrading member vertically spaced from said first and second abrading members and simultaneously operable to abrade a label on a container with each of the axes within said stations in separate vertically spaced planes.

9. A delabeler for removing one or more labels from a container providing a labeled base portion of a wide diameter and a labeled neck portion of a narrow diameter, comprising means to move a series of the containers through a processing station, first and second label abrading members each rotating about a generally horizontal axis, support means connected to said first and second label abrading members to position said first member axis in a first plane to engage and remove at least a portion of the label from the container neck portion and to position said second member axis in a second plane spaced from said first plane to simultaneously engage and remove at least a portion of the label from the container base portion.

10. A delabeler for removing labels from containers, comprising means to move a series of the containers through a processing station, a plurality of brushes each including a plurality of circumferentially spaced, radially extending bristles rotating about a generally horizontal axis spaced adjacent to said moving means, and support means connected to said brushes to radially space said brushes with respect to each other and to simultaneously engage the brushes against a moving container to remove at least a portion of the label from each container.

11. A delabeler for removing labels from containers, comprising means to move a series of the containers through a processing station, label abrading means including first and second label abrading members each rotating about an axis, support means connected to support said first and second label abrading members in spaced relationship along said moving means and in separate spaced planes to engage said first and second abrading members against different portions of the moving containers to remove at least a portion of the label from each container, and coupling means interconnecting said first and second abrading members for simultaneous rotation and including a pair of facing nipples fixedly connected to axial ends of said first and second abrading members for rotation therewith and a coupler providing spaced cavities each pivotally coupled to one of the nipples for rotation therewith to provide simultaneous rotation between said first and second abrading members while operating in separate spaced planes.

12. The delabeler of claim 11, wherein said coupler includes a drive shaft joined to oppositely spaced yokes each providing one of said spaced cavities.

13. A delabeler for removing labels from containers, comprising means to move a series of the containers through a processing station including a rail to slidably support the containers in an upstanding position, movable means including a movable member operable to move along one side of said supporting rail while engaging the containers and stationary means including a stationary member extending along another side of said supporting rail and oppositely disposed with respect to said movable member to maintain a positive sandwiching engagement of the containers between said stationary member and said movable member to positively rotatably slide the containers along said supporting rail in response to said movable member, and a label abrading member rotating about a generally horizontal axis spaced adjacent said supporting rail and operatively stripping at least a portion of the label as the containers rotatably slide along said rail.

14. A delabeler for removing labels from containers, comprising means to move a series of the containers through a processing station including a rail to slidably support the containers in an upstanding position, movable means including a movable member operable to move along one side of said supporting rail while engaging the containers and stationary means including a stationary member extending along another side of said supporting rail and oppositely disposed with respect to said movable member to maintain a positive sandwiching engagement of the containers between said stationary member and said movable member to positively rotatably slide the containers along said supporting rail in response to said movable member, said stationary member is connected to a fixed support through a biasing spring operatively applying clamping pressure to the rotatably sliding containers, and a label abrading member rotating about an axis spaced adjacent said supporting rail and operatively stripping at least a portion of the label as the containers rotatably slide along said rail.

15. A delabeler for removing labels from containers, comprising means to move a series of the containers through a processing station including a rail to slidably support the containers in an upstanding position, movable means including a movable member operable to move along one side of said supporting rail while engaging the containers and stationary means including a stationary member extending along another side of said supporting rail and oppositely disposed with respect to said movable member to maintain a positive sandwiching engagement of the containers between said stationary member and said movable member to positively rotatably slide the containers along said supporting rail in response to said movable member, and a label abrading member rotating about an axis spaced adjacent said supporting rail and connected to a fixed support through a biasing spring to operatively apply stripping pressure against the containers by said abrading member and operatively stripping at least a portion of the label as the containers rotatably slide along said rail.

16. A delabeler for removing labels from containers, comprising means to move a series of the containers through a processing station including a rail to slidably support the containers in an upstanding position, movable means including a movable member operable to move along one side of said supporting rail while engaging the containers and stationary means including a stationary member extending along another side of said supporting rail and oppositely disposed with respect to said movable member to maintain a positive sandwiching engagement of the containers between said stationary member and said movable member to positively rotatably slide the containers along said supporting rail in response to said movable member, and a label abrading member rotating about an axis spaced adjacent said supporting rail and operatively stripping at least a portion of the label as the containers rotatably slide along said rail, said stationary member and said abrading member are mutually connected to common supporting means including adjustable means to operatively vary the stripping force applied by said abrading member to the containers.

17. The delabeler of claim 16, wherein said adjustable means includes a selectively adjustable linkage connected to said stationary member.

18. The delabeler of claim 16, wherein said common supporting means is connected to a fixed support through a biasing spring to operatively apply clamping pressure to the rotatably sliding containers by said stationary member and stripping pressure against the containers by said abrading member.

* * * * *